United States Patent [19]

Michon et al.

[11] Patent Number: 4,762,402

[45] Date of Patent: Aug. 9, 1988

[54] SYSTEM MAKING IT POSSIBLE TO OBTAIN A SELECTIVE REACTION IN PHOTOCHEMICAL PROCESSES ON THE BASIS OF LASER BEAMS INCORPORATING MEANS FOR DISTRIBUTING SAID BEAMS

[75] Inventors: Maurice Michon, Draveil; Paul Rigny, Sceaux, both of France

[73] Assignee: Commissariat A L'Energie Atomique, Paris, France

[21] Appl. No.: 40,086

[22] Filed: Apr. 20, 1987

[51] Int. Cl.$^4$ .............................................. G21K 5/00
[52] U.S. Cl. .................................. 350/370; 250/281; 250/423 P
[58] Field of Search ............................. 350/385, 370; 250/423 P, 373, 281

[56] References Cited

U.S. PATENT DOCUMENTS 3,935,451 1/1976 Janes ................................. 250/423 P
4,189,646 2/1980 Vandenleeden ................. 250/373 X

FOREIGN PATENT DOCUMENTS 2253296 6/1975 France .
2341873 9/1977 France .
2018011 10/1979 United Kingdom .

Primary Examiner—Bruce Y. Arnold
Attorney, Agent, or Firm—James E. Nilles

[57] ABSTRACT

The invention relates to a system making it possible to obtain a selective reaction in photochemical processes from laser beams, comprising means for distributing said beams permitting a good utilization of the light energies.

This system comprises in a sealed enclosure: the matter being in the state of a vapor from which it is wished to extract a chemical or isotopic species, laser sources emitting into said enclosure; a beam $S_1$ permitting a selective excitation of the species to be extracted and a beam $S_2$ permitting a transformation of said excited species. This system also comprises means for distributing the beams and incorporating means for superimposing the beams $S'_1 \ldots S_1^{(n)}$ with n being an interger at least equal to 1 and for forming several beams $S_1$ which it is wished to introduce at several points through the vapor to be treated, means for introducing beams $S_1$ and beam $S_2$ into the enclosure in such a way that their paths are different and means for inverting them along parallel arms.

Application to the isotopic separation of an atom or molecule, or to the photoisomerization of a molecule.

7 Claims, 6 Drawing Sheets

SYSTEM MAKING IT POSSIBLE TO OBTAIN A SELECTIVE REACTION IN PHOTOCHEMICAL PROCESSES ON THE BASIS OF LASER BEAMS INCORPORATING MEANS FOR DISTRIBUTING SAID BEAMS

BACKGROUND OF THE INVENTION

The present invention relates to a system making it possible to obtain a selective reaction in photochemical processes on the basis of laser beams incorporating means for distributing said beams.

The invention applies to photochemical processes requiring the combined action of several light emissions of different wavelengths in order to obtain a selective reaction, such as an isotopic separation or a photoisomerization.

Isotopic separation can e.g. be used for eliminating an isotope which is incompatible with the industrial use of a product, such as in the case of purifying metals or for selecting a useful isotope, e.g. carbon or uranium.

By the rearrangement of the atoms of a molecule previously excited by light emissions, the photoisomerization of molecules makes it possible to obtain a molecule having different spectroscopic and chemical properties.

To obtain the sought selective reaction, it is possible to proceed in known manner in two stages. The first stage consists of selectively exciting an isotopic or chemical species on the basis of one or more laser radiations. The second stage consists of causing the transformation of the previously excited species by a final laser radiation having an adequate energy.

The selective excitation of the species, i.e. the molecule or atom, takes place in known manner by successive passages of the molecule or atom in question to levels having an ever higher energy by absorption of photons, each photon coming from a pulse laser with a particular wavelength.

In certain cases, selective excitation can be obtained by absorption of a single photon and therefore by the passage of the molecule or atom in question to a single energy level.

The excited species is transformed by irradiating it with a laser beam of a wavelength such that it clears the level corresponding to said transformation. This leads either to the formation of a new molecule or to the ionization of a molecule or atom. In this way, it is possible to distinguish the species formed from other species and separate them.

Figure 1:
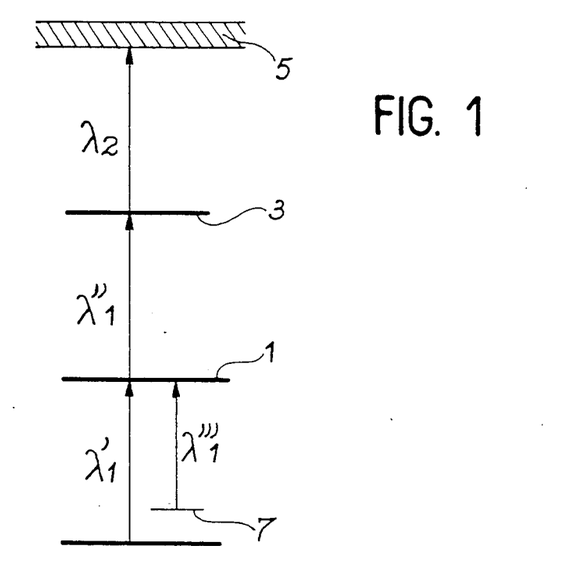
FIG. 1: Already described, diagrammatically an example of transitions at several levels in $U^{235}$ making it possible to obtain its ionization.

FIG. 1 shows an example of transitions at several levels in $U^{235}$ making it possible to bring about its ionization. Thus, to separate the isotope $U^{235}$ from uranium vapour, use is made of a selective excitation beam $S_1$ constituted by two beams $S'_1$ and $S''_1$ of respective wavelengths $\lambda'_1$ and $\lambda''_1$, which bring the atoms of isotope $U^{235}$ to two successive levels 1, 3. A final beam $S_2$ of wavelength $\lambda_2$ brings the excited atoms of $U^{235}$ into an ionization state 5. The ionization energy of isotope $U^{235}$ is equal to 6.12 eV, so that each of the wavelengths $\lambda'_1$, $\lambda''_1$, $\lambda_2$ is approximately 600 nm.

In order to optimize the isotopic separation of $U^{235}$, use can be made of a fourth wavelength $\lambda_1'''$ associated with a beam $S_1'''$ in order to bring the atoms already at an intermediate energy level 7, occupied by a thermal process, to level 1, so as to be ionized following successive irradiations at wavelengths $\lambda''_1$ and $\lambda_2$.

Throughout the remainder of the text, $S_1$ will be used for the beam permitting the selective excitation of the species in question, whereby $S_1$ can contain a single wavelength $\lambda_1$ or can result from a superimposing of beams $S'_1$, $S''_1$, ... $S_1^{(n)}$ of wavelengths $\lambda'_1$, $\lambda''_1$, ... $\lambda_1^{(n)}$, with n being an integer equal to at least 1 and $S_2$ is the beam of wavelength $\lambda_2$ permitting the ionization or photodissociation of the previously excited species.

The different wavelengths are obtained in known manner from dye lasers, (e.g. rhodamine lasers) excited by other lasers, which can be copper vapour lasers. This gives pulse-type light emissions of a few dozen ns and a repetition frequency of a few kHz.

In known manner, beams $S_1$ and $S_2$ are transmitted in the same propagation direction into an enclosure containing the substance from which a chemical or isotopic species is to be extracted and which is in the form of a vapour flow. The effective absorption sections of the transitions corresponding to the selective excitation and transformation of the species in question can differ. The effective absorption sections of the transitions corresponding to the selective excitation can be 10 to 100 times greater than that corresponding to the transformation. Moreover, to retain a good selectivity, an excessive power of beam $S_1$ must not be used, because this would lead to a loss of selectivity resulting e.g. from broadening through saturation, or to transitions with several photons. Following interaction of the beams $S_1$ and $S_2$ with the species in question, beam $S_1$ is very attenuated compared with beam $S_2$. Thus, the simultaneous presence of these two beams cannot be maintained throughout their passage in the enclosure. As a result of this interaction beam $S_2$ is not very well used, its energy being wasted in the final part of the path where beam $S_1$ is highly attenuated.

Thus, the prior art means do not make it possible to optimize the use of these beams.

SUMMARY OF THE INVENTION

The object of the present invention is to obviate this disadvantage. This is achieved through the use of an apparatus making it possible to introduce the selective excitation beam $S_1$ through the vapour to be treated at several points, whereby said beam can result from a superimposing of beams $S'_1$, $S''_1$, ... $S_1^{(n)}$ of wavelength $\lambda'_1$, $\lambda''_1$ ... $\lambda_1^{(n)}$ with n being an integer of at least 1, whereas beam $S_2$ is only introduced once at the inlet of the apparatus.

More specifically the present invention relates to a system making it possible to obtain a selective reaction in photochemical processes from laser beams comprising:

in a sealed enclosure, the substance from which it is wished to extract an isotopic or chemical species, said substance being in the form of a vapour flow, laser sources emitting towards said enclosure a beam $S_1$ permitting a selected excitation of the species to be extracted and a beam $S_2$ permitting a transformation of said excited species, wherein said system also comprises means for distributing the beams having:

means for superimposing the beams $S'_1$, $S''_1$, ..., $S_1^{(n)}$, with n being an integer equal to at least 1, for constituting several beams $S_1$ introduced at several points through the vapour to be treated, means for introducing into the enclosure the resulting beams $S_1$ and the beam $S_2$ so as to make them colinear, whilst still distinguishing them by one of their characteristics, such as a different polarization or an opposite proagation direction, said introduction means being periodically distributed on parallel arms defining propagation directions of said beams in the enclosure, so as to optimize the use of the light energies of the different beams.

According to a constructional variant of the system according to the invention, the latter also comprises quarterwave plates making it possible to obtain a circular polarization of beams $S_1$ and $S_2$, when it is advantageous to have circularly polarized light beams to interact with the vapour, said means being located upstream and downstream of the introduction means.

According to another embodiment of the system, the means for introducing beams $S_1$ and $S_2$ into the enclosure comprise Glan prisms, into which said beams are injected with two orthogonal polarizations and in directions such that after their passage in said prisms they are colinear. Each prism is located on an arm at the points where $S_1$ is reintroduced into the enclosure.

According to another embodiment of the system, the latter comprises for inverting beams $S_1$ and $S_2$ along parallel arms.

According to an embodiment of the system corresponding to cavity operation, the means for introducing beams $S_1$ and beam $S_2$ into the enclosure comprise a Glan prism at each end of an arm corresponding to one propagation direction of beams $S_1$ and $S_2$ into the vapour and on each of the arms formed in the enclosure. Each of the beams $S_1$ and $S_2$ is introduced with the same polarization into one of the Glan prisms at each end of an arm and in directions which, following their passage in said prisms, enable them to have the same propagation direction, but the opposite sense.

According to another embodiment of the system corresponding to cavity operation, the latter comprises means for reflecting beams $S_1$ and $S_2$ back on to themselves, said means incorporating plane mirrors associated with Pockels cells, each plane mirror - Pockels cell assembly being located at each end of the arms and means for inverting beam $S_2$ towards other arms, said means incorporating a Pockels cell located on each arm.

According to an embodiment of the system, the means for superimposing beams $S'_1, S''_1, \ldots, S_1^{(n)}$ so as to constitute beams $S_1$ comprise a group of semitransparent plates having a reflection coefficient 0.5 which successively divide into two the different beams $S'_1, S''_1 \ldots, S_1^{(n)}$, whilst superimposing the divided beams to obtain the different beams $S_1$ used in the system.

BRIEF DESCRIPTION OF THE DRAWINGS

The invention is described in greater detail hereinafter relative to non-limitative embodiments and the attached drawings, which show:

FIGS. 5a and 5b: Diagrammatically represent in 5a an example of a system according to the invention with cavity operation and in 5b the different voltages applied as a function of time to Pockels cells used in the system of FIG. 5a.

DETAILED DESCRIPTION OF THE PREFERRED EMBODIMENTS

Figure 2:
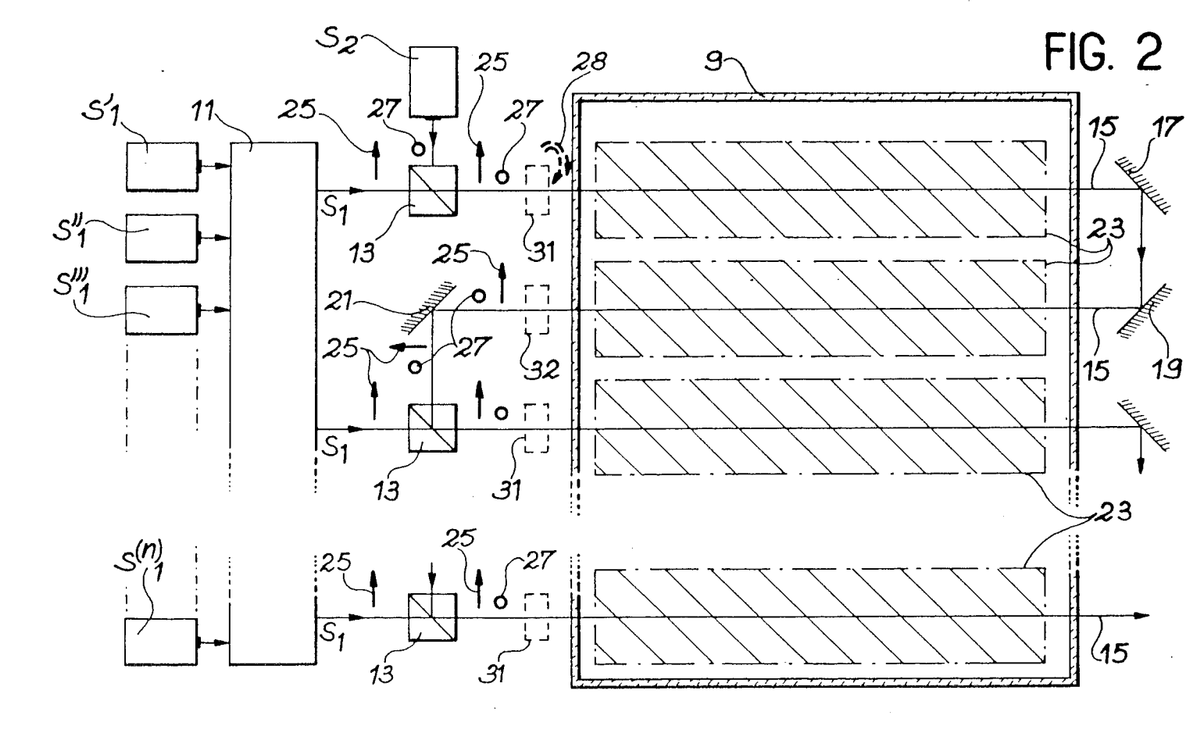
FIG. 2: Diagrammatically an example of the system according to the invention.

FIG. 2 diagrammatically shows an example of a system according to the invention. This system comprises a sealed enclosure 9 containing the substance from which it is wished to extract a chemical or isotopic species, said substance being in the form of a vapour flow. Laser sources emit towards said enclosure 9 a beam $S_1$, which can be formed from one or more beams $S'_1, S''_1, \ldots, S_1^{(n)}$, with n being an integer at least equal to 1, and a beam $S_2$. Means 11 make it possible to superimpose the different beams $S'_1, S''_1 \ldots S_1^{(n)}$ to obtain several beams $S_1$, whereby said means 11 will be described in FIG. 6. A beam $S_1$ corresponding to the selective excitation of the species to be extracted is introduced at several regularly distributed points into enclosure 9, whilst beam $S_2$ corresponding to the transformation of said species is only introduced once. The means for introducing beams $S_1$ and $S_2$ into enclosure 9 are represented by Glan prisms 13, whilst the means for inverting these beams along parallel arms 15 are represented by plane mirrors 17, 19, 21. Thus, these mirrors successively reflect by 90° beams $S_1$ and $S_2$, so that they traverse the complete enclosure 9 and along their passage create interaction zones 23 between the photons and certain molecules or atoms of the substance present. As a function of the case, these molecules or atoms are at energy levels corresponding to that of the photons of beams $S_1$ and $S_2$ injected into enclosure 9.

The remainder of the description provides an understanding of the operation of the system shown in FIG. 2. The two beams $S_1$ and $S_2$ are introduced from a Glan prism 13 with orthogonal polarization directions 25, 27. Beam $S_1$ has a polarity 25 in the plane containing the propagation directions of the laser beams, whilst beam $S_2$ has a polarization 27 perpendicular to said plane. The polarization difference between the two beams $S_1$ and $S_2$ makes it possible to distinguish them in the overall system. After passing through the Glan prism 13, beams $S_1$ and $S_2$ are colinear. Thus, in the case of FIG. 2, the Glan prism 13 is positioned in such a way that beam $S_1$ is transmitted and beam $S_2$ reflected by 90°. The two beams $S_1$ and $S_2$ are then superimposed and traverse the enclosure 9 containing the vaporized substance creating a photon - substance interaction zone 23. After passing through enclosure 9 along a first arm 15, the beams $S_1$ and $S_2$ are reflected by 90° by a first plane mirror 17, then by a second plane mirror 19 enabling beams $S_1$ and $S_2$ to pass in the reverse sense along a second arm 15 parallel to the first. During the passage of these beams along said second arm 15, a second substance - photon interaction zone 23 is formed. At the end of this arm, a plane mirror 21 makes it possible to reflect these beams on to a second Glan prism 13. During the passage of said prism, beam $S_2$ is again reflected by 90° due to its polarization, whilst beam $S_1$, which is very attenuated, following the various interactions with the substance is transmitted by the prism and is lost in the system.

A beam $S_1$ of the same polarization is as previously then injected through said second Glan prism 13, and after passing through the latter, the transmitted beam $S_1$ is superimposed on the reflected beam $S_2$. Thus, the same conditions occur as during the first introduction of the beams $S_1$ and $S_2$ into the system. The sequence of operations is the same as that described hereinbefore and is repeated in such a way that the entire enclosure is scanned by beams $S_1$ and $S_2$ along parallel arms, thus producing substantially adjacent interaction zones 23.

As a function of the substance - photon interaction type, it can be of interest to have a circular polarization 28 of beams $S_1$ and $S_2$. In this case, it is merely necessary to introduce into the overall system a quarter-wave plate 31 between the Glan prism 13 and the entrance to enclosure 9 in a beam propagation direction corresponding to an arm 15 and a further quarterwave plate 32 on an arm 15 traversed in the reverse sense by the beams between the outlet of enclosure 9 and Glan prism 13 and so on throughout the apparatus. These quarter-wave plates 31, 32 are e.g. constituted by Fresnel parallepipeds. The association of a quarter-wave plate 31, 32 with each prism 13 makes it possible to obtain from linearly polarized beams $S_1$, $S_2$ a circular polarization and vice versa.

In the example of FIG. 2, beam $S_1$ successively passes twice into enclosure 9 before being reinjected into the enclosure, but if it is not excessively attenuated following the different interactions with the substance, its utilization can be optimized by making it perform several passages of enclosure 9 in both senses and in directions forming parallel arms 15 until it is very attenuated. For this purpose, series of plane mirrors are added on the passage or path of beams $S_1$ and $S_2$, so that the latter are reflected as many times as is necessary, as hereinbefore.

In order to synchronize the pulses of the reinjected beams $S_1$ and those of beam $S_2$, use is made of not shown delay lines, which can be constituted by a succession of plane mirrors, between which successive reflections take place.

Figure 3:
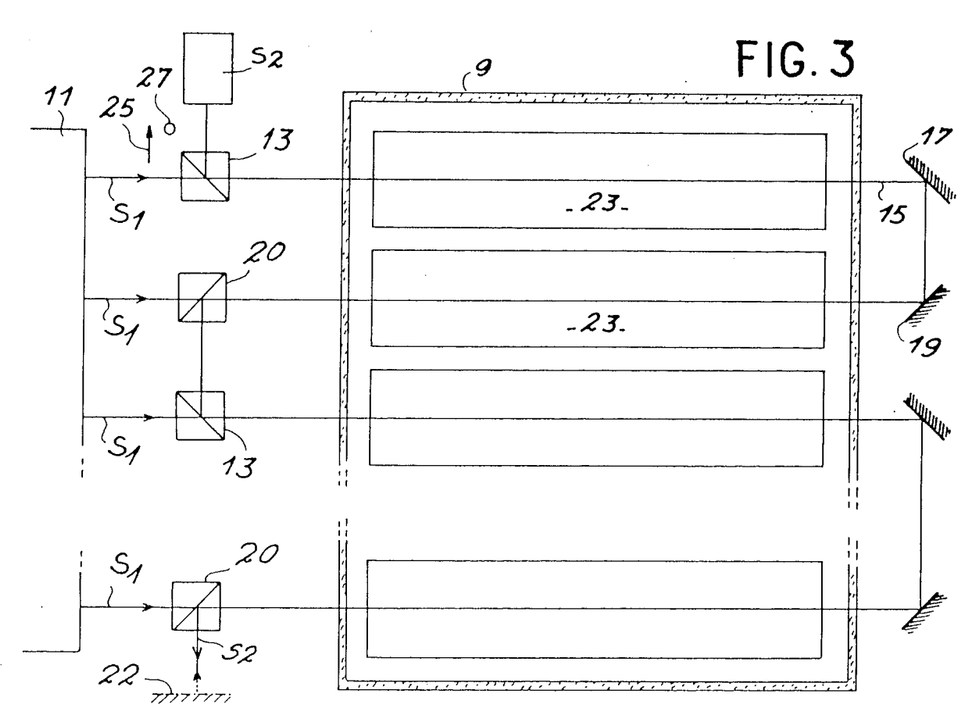
FIG. 3: Another example of the system according to the invention.

Various modifications can be made to the aforementioned system. Thus, FIG. 3 shows an embodiment of the system according to the invention permitting a better utilization of the photons and the vapour.

The plane mirror 21 is replaced by a Glan prism 20 arranged so as to reflect only beam $S_2$ by 90° and to transmit the highly attenuated beam $S_1$. Another beam $S_1$ is then reinjected into the inlet of enclosure 9 at said level, i.e. at the end of arm 15 traversed in the reverse sense by the preceding beam $S_1$. Thus, said beam $S_1$ will travel the path in the reverse sense and this also applies throughout the remainder of the system. Moreover, a beam $S_2$ is reinjected level with the outlet of beam $S_2$, i.e. at the end of the passage of beam $S_2$ through enclosure 9. Thus, the beams $S_1$ and $S_2$ traverse the vapour in both senses, thereby adequately interacting with the molecules or atoms located at the end of the paths of said beams.

A variant of the latter device to bring about a better utilization of beam $S_2$ is obtained by adding a mirror 22 at the end of the path of beam $S_2$ in enclosure 9, so as to reflect it back into the latter in the same propagation directions as those of the incident beam $S_2$. Following a double passage in enclosure 9, $S_2$ is then almost completely absorbed.

Figure 4A:
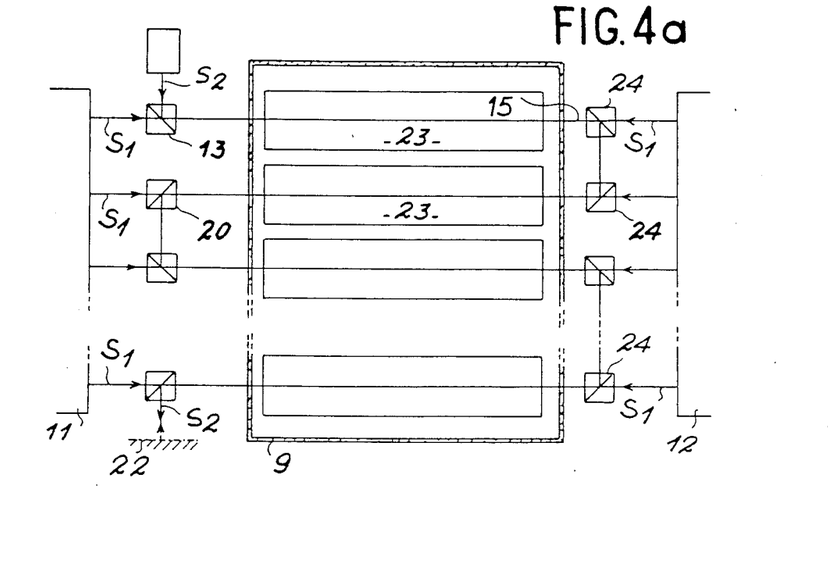
FIGS. 4a and 4b: Other examples of the system according to the invention.
Figure 4B:
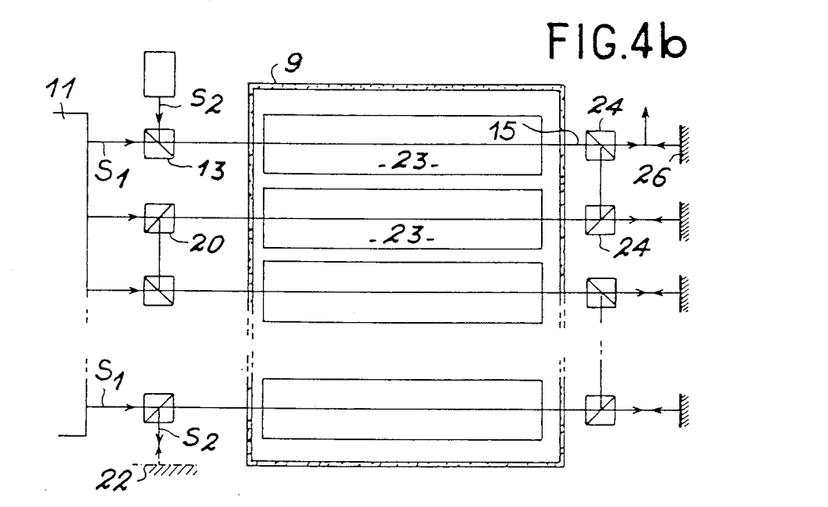

FIGS. 4a and 4b show other embodiments of the system according to the invention, in which beams $S_1$ are introduced at the opposite end of enclosure 9 on each arm 15.

Thus, in FIG. 4a, a second laser source identical to the first has been added and permits the symmetrical introduction with respect to the beams $S_1$ from the superimposing means 11, of beams $S_1$ coming from superimposing means 12 which are identical to means 11.

A variant of this system, as shown in FIG. 4b, comprises reflecting back on to itself each beam $S_1$ by using a plane mirror 26 positioned at the opposite end from the entrance of beam $S_1$ and also for each arm 15. In these two systems, a second Glan prism 24 is placed on each arm 15 upstream of the entry of beam $S_1$ from the second laser or upstream of the mirror, so as to deflect beam $S_2$ towards the remainder of enclosure 9.

Use is made of Glan prisms in the aforementioned system, but it is also possible to use any other apparatus making it possible to superimpose two light beams of orthogonal polarity entering the same in perpendicular directions or to separate such beams entering the same with the same direction.

In place of the plane mirrors, it is possible to use any other apparatus making it possible to reflect polarized beams by 90°, whilst retaining the polarity thereof.

Figure 5A:
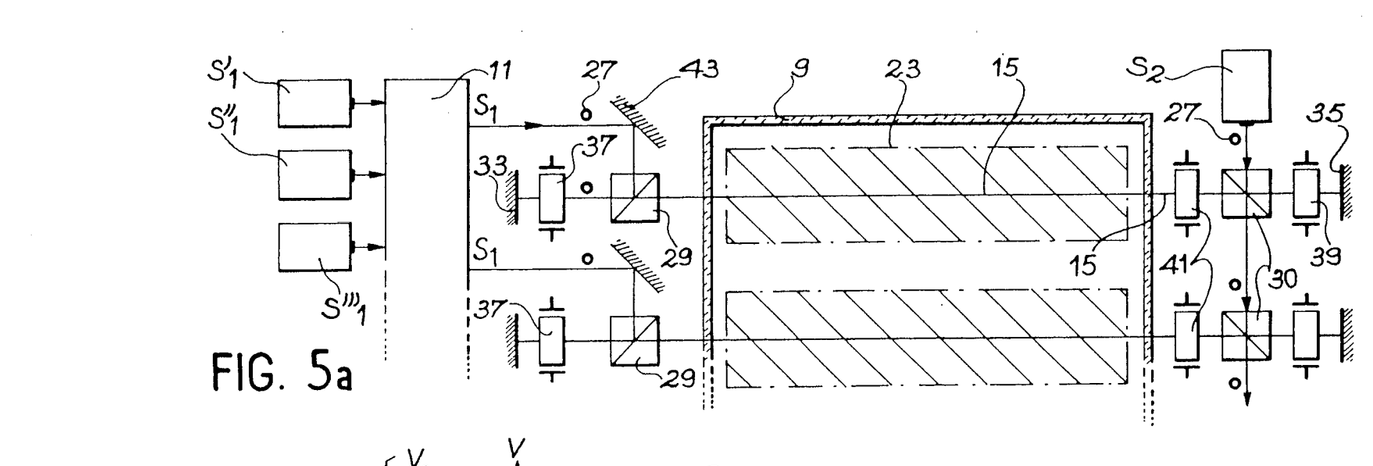
Figure 5B:
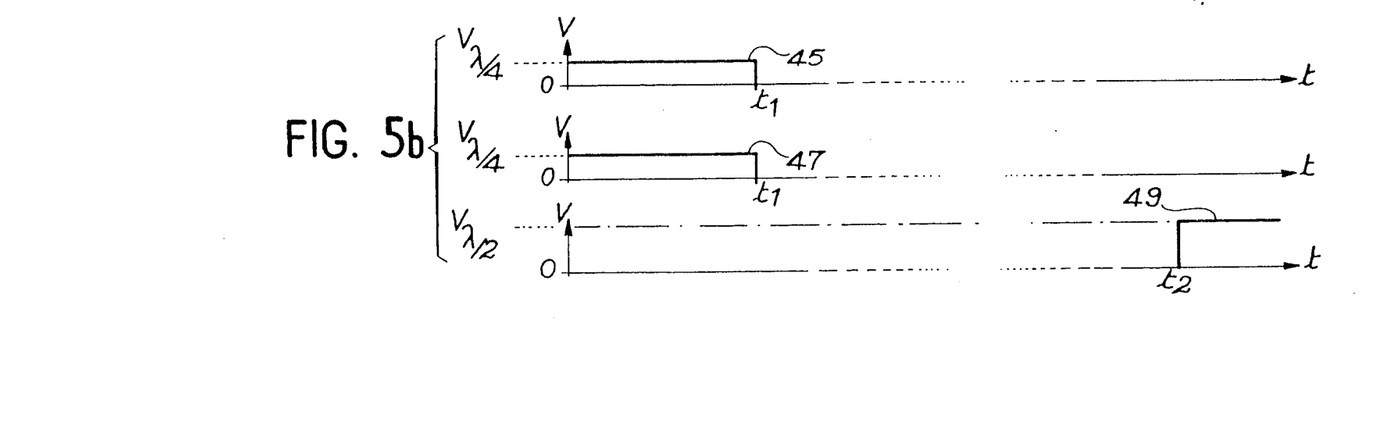

FIGS. 5a and 5b show an embodiment of a system according to the invention operating in cavity manner. In this embodiment, to achieve optimum use of the molecules or atoms in the interaction zones 23, these zones are traversed several times by laser beams $S_1$ and $S_2$. Such an apparatus is shown in FIG. 5a. In FIG. 5a is shown a sealed enclosure 9 containing the substance in the form of a vapour flow and whereof it is wished to extract an isotopic or chemical species. Laser sources emit into said enclosure a beam $S_1$, which can be constituted by several beams $S'_1, S''_1, \ldots S_1^{(n)}$ with n being an integer at least equal to 1, as well as a beam $S_2$.

Means 11 make it possible to superimpose the different beams $S'_1, S''_1, \ldots S_1^{(n)}$ to obtain several beams $S_1$. A beam $S_1$, corresponding to the selective excitation of the species to be extracted, is introduced at several regularly spaced points into enclosure 9 in parallel directions forming arms 15, whilst the beam $S_2$, corresponding to the transformation of said species, is only introduced once into enclosure 9 and traverses the same in the same directions forming arms 15.

The means for introducing beams $S_1$ and $S_2$ into enclosure 9 are represented by Glan prisms 29, 30, each beam $S_1$ being injected through a prism 29, whilst beam $S_2$ is injected through a prism 30. The means for reflecting beams $S_1$ and $S_2$ on to themselves are represented by plane mirrors 33, 35 respectively associated with Pockles cells 37, 39, whilst the means for inverting beam $S_2$ towards other propagation directions forming parallel arms 15 are represented by a Pockles cell 41 associated with Glan prism 30.

Thus, beams $S_1$ and $S_2$ are respectively injected across a Glan prism 29, 30 with the same polarization 27 perpendicular to the plane containing the propagation directions of the beams and in the same propagation directions forming arms 15. Thus, beams $S_1$ and $S_2$ have two opposite propagation senses making it possible to distinguish them in the complete system, despite their identical polarization 27.

The assemblies constituted by plane mirrors 33, 35 and Pockels cells 37, 39 make it possible to cause beams $S_1$ and $S_2$ to traverse the same interaction zone 23 a number of times before transmitting beam $S_2$ alone, through Pockels cell 41, into the following interaction zone 23.

The voltages applied to the different Pockels cells as a function of time are shown in FIG. 5b.

The remainder of the description provides a better understanding of the operation of the system shown in FIG. 5a.

Beam $S_1$ of polarization 27 is introduced into enclosure 9 by injecting through a Glan prism 29 following a reflection by 90° on a plane mirror 43. This beam is reflected by the Glan prism 29 and then passes through a first Pockels cell 37. For a time $t_1$ (FIG. 5b), a quarter-wave voltage $V_{\lambda/4}$, 45 is applied to said cell. Following the passage through cell 37, the polarization of beam $S_1$ is circular. $S_1$ is then reflected on itself by a plane mirror 33 perpendicular to the propagation direction of beam $S_1$, the latter then again passing through cell 37. Following its second passage through cell 37, beam $S_1$ has a polarization perpendicular to that of the incident beam and is therefore transmitted by the Glan prism 29. At the same time as beam $S_1$, beam $S_2$ is introduced into enclosure 9 at the other end of arm 15 in a symmetrical manner. It is then firstly injected through a Glan prism 30 with the same polarization 27, is then reflected by the latter and then passes through a Pockels cell 39 to which a quarter-wave voltage 47 is also applied for the same time $t_1$. A plane mirror 35 perpendicular to the propagation direction thereof reflects the beam on itself and it then passes into the Pockels cell 39 again. Following its second passage in cell 39, beam $S_2$ has a polarization perpendicular to that of the incident beam and the latter is then transmitted by the Glan prism 30. The Pockels cell 41 is passive, i.e. it does not modify the state of the radiation passing through it. Thus, the two beams $S_1$ and $S_2$ have the same propagation direction corresponding to an arm 15, but are of the opposite sense. Thus, during their passage in enclosure 9, they produce an interaction zone 23 between photons and substance. These beams are reflected towards interaction zone 23 whenever they reach the ends of an arm 15 by an assembly constituted by Pockels cell 37 (39) and a plane mirror 33 (35).

The zero voltage applied to the Pockels cell 41 is maintained for as long as it is wished to pass beams $S_1$ and $S_2$ into the same interaction zone 23. When the number of outward and return passages performed in the same zone 23 by beams $S_1$ and $S_2$ is such that beam $S_1$ is totally absorbed or highly attenuated, beam $S_2$ is freed by applying to cell 41 a voltage $V_{\lambda/2}$, 49 at time $t_2$. In a single passage of beam $S_2$ in cell 41, the polarization of the resultant beam $S_2$ is perpendicular to that of the incident beam. The latter is then reflected by 90° by Glan prism 30 towards an assembly similar to that described hereinbefore.

To ensure that beams $S_1$ and $S_2$ injected at each end of enclosure 9 are superimposed in interaction zones 23, the latter must have a length close to $C\Delta t$ in which C represents the speed of light in the gaseous medium in question and $\Delta t$ the mid-height width of the light pulses of the laser beams. The length of the optical cavity in which the system is located must be approximately twice as large as that of the interaction zone 23 so that during the injection, i.e. before time $t_1$, the photons introduced by one end do not leave by the other.

This cavity operation consequently makes it possible to act with all the initially available intensity on beam $S_2$ and to simultaneously use all the energy emitted by the lasers.

In the same way for the apparatus described in FIG. 2, the pulses of beam $S_1$ must be synchronized with those of beam $S_2$, the life of the transitions being approximately equal to that of the pulses, i.e. roughly a few dozen ns. For this use is made of a delay line, which is a "cavity without atoms". For this purpose, through a Glan prism is injected beam $S_1$, which is reflected towards a zone outside the interaction zone 23. In said zone, beam $S_1$ performs successive outward and return paths on itself as a result of plane mirrors positioned at each end of said cavity and is freed, as hereinbefore, by applying a voltage to a Pockels cell located on its path.

Figure 6:
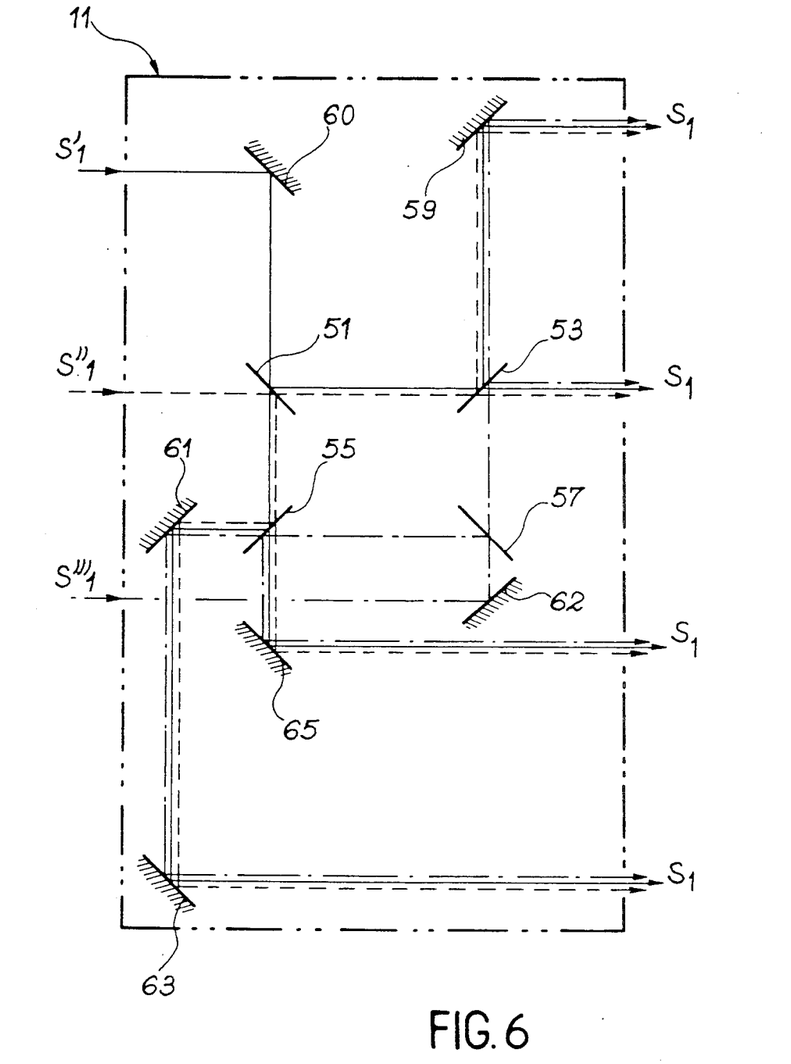
FIG. 6: Diagrammatically an example of the apparatus making it possible to successively divide several beams and superimpose them.

FIG. 6 shows an embodiment of the means 11 making it possible to superimpose several beams constituting beam $S_1$. As has been shown hereinbefore, the selective excitation beam $S_1$ is generally formed from several beams $S'_1, S''_1, \ldots S_1^{(n)}$ of respective wavelengths $\lambda'_1, \lambda''_1, \ldots \lambda_1^{(n)}$ with n being an integer at least equal to 1. Thus, these beams must be split and then superimposed in order to be injected into the system according to the invention. Thus, for splitting and superimposing several beams use is made of a group of plane mirrors positioned at 45° with respect to the propagation direction of these beams.

In the case of FIG. 4, as in the case of the isotopic separation of $U^{235}$ from uranium vapour, consideration is given to three beams $S'_1, S''_1$ and $S_1'''$ of respective wavelengths $\lambda'_1, \lambda''_1,$ and $\lambda_1'''$. These beams are split and superimposed by successive beam splitting plates 51, 53, 55, 57 of reflection coefficient 0.5, the resultant beams $S_1$ being directed in parallel propagation directions by total reflection plane mirrors 59, 61, 63, 65 towards different inlets of the enclosure of the system according to the invention. In this embodiment, the plane mirrors 60 and 62 solely make it possible to transmit beams $S'_1$ and $S_1'''$ respectively to beam splitting plates 51 and 57.

Thus, half the beams $S'_1$ and $S''_1$ reaching plate 51 in two orthogonal directions is transmitted, whereas the other half is reflected. Each transmitted half of one of the beams is superimposed on the reflected half of the other beam and vice versa. These halves of the superimposed beams are again split into two by two plates 53 and 55. In the same way, beam $S_1'''$ is split into two by plate 57, the resultant beams being again split by plates 53 and 55, thus being superimposed on the split beams from $S'_1$ and $S_1''$. This leads to four beams $S_1$ resulting from the superimposing and splitting into four of beams $S'_1, S_1''$ and $S'''_1$. By successive splitting operations, it is possible to obtain the same number of beams $S_1$ of the same wavelength as is required by the system according to the invention.

Figure 7:
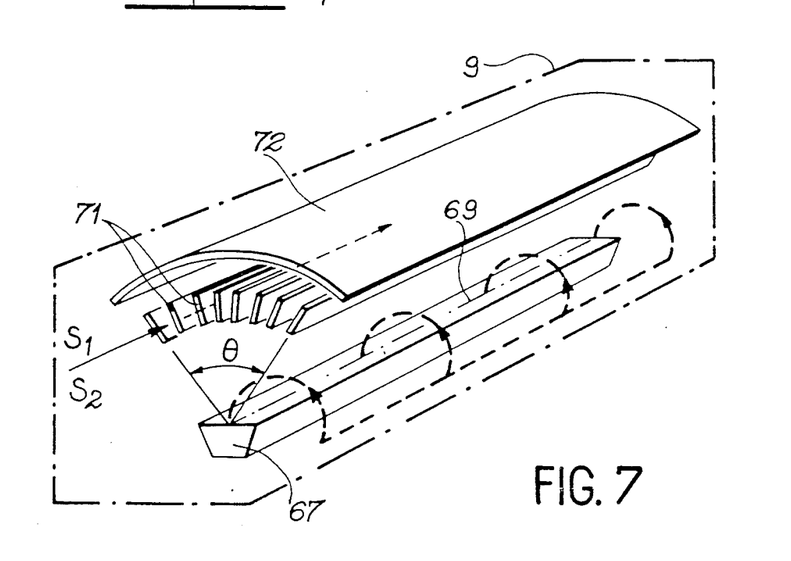
FIG. 7: A system making it possible to vaporize the substance from which it is wished to extract an isotopic species and collect said species in ionic form.

FIG. 7 shows a known installation making it possible to vaporize the substance, whereof it is wished to extract an isotope and collect it when it is ionized. This type of installation is used for separating the isotope $U^{235}$ from uranium or for purifying palladium by eliminating isotope $Pd^{107}$. The matter, in the form of ingot 67 is heated by electron bombardment along line 69 up to the evaporation temperature of said matter.

The vaporized atoms have a high kinetic energy. The atoms vaporized within an angle $\theta$ are then irradiated by laser beams $S_1$ and $S_2$ introduced into said installation in accordance with a system according to the invention. Beam $S_1$ selectively excites $U^{235}$, whilst beam $S_2$ ionizes the previously excited atoms. On either side of the laser beams traversing the vapour and interacting therewith are arranged collecting plate 71 between which an electric field is created.

The ionized atoms are deflected by this field and then collected by plate 71. The non-ionized neutral atoms continue their path towards a target 72, where the vapour condenses.

The number of plates 71 necessary for the optimum exploitation of the atoms emitted in angle $\theta$ is determined by the maximum spacing between the plate 71 compatible with a minimum charge exchange between the ions and the neutral atoms.

As has been shown hereinbefore, the system according to the invention is also applicable to the molecular isotopic separation process. In this case, the molecules are firstly excited by a first beam $S_1$ and are then photodissociated by a second beam $S_2$. The separation of these dissociated molecules in particular takes place by condensation.

Thus, no matter what the variants used, the system according to the invention makes it possible to compensate the small effective transition section corresponding to the transformation of the species to be extracted, i.e. the ionization or photodissociation, whilst optimizing the photon - matter/substance interaction.

What is claimed is:

1. A system making it possible to obtain a selective reaction in photochemical processes on the basis of laser beams comprising:

in a sealed enclosure, the substance whereof a species is to be extracted, said substance being in the form of a vapour flow, laser sources emitting towards said enclosure a beam $S_1$ permitting a selective excitation of the species to be extracted and a beam $S_2$ permitting a transformation of said excited species, wherein it comprises means for distributing the beams having:

means for superimposing the beams $S'_1, S''_1, \ldots S_1^{(n)}$ with n being an integer at least equal to 1, and for constituting several beams $S_1$ introduced at several points through the vapour to be treated, means for introducing into the enclosure the resultant beams $S_1$ and also beam $S_2$ so as to make them colinear, whilst distinguishing them by one of their characteristics, said introduction means being periodically distributed on parallel arms defining the propagation directions of said beams in the enclosure.

2. A system according to claim 1, wherein it also comprises quarter-wave plates making it possible to obtain a circular polarization of beams $S_1$ and $S_2$, located upstream and downstream of the introduction means.

3. A system according to claim 1, wherein the means for introducing beams $S_1$ and beam $S_2$ into the enclosure are constituted by Glan prisms into which said beams are injected with two orthogonal polarizations and in directions which, following their passage into the prisms, can be colinear, each prism being located on an arm at the points where $S_1$ is reintroduced into the enclosure.

4. A system according to claim 1, wherein it also comprises means for inverting the beams $S_1$ and $S_2$ along parallel arms.

5. A system according to claim 1, wherein the means for introducing beams $S_1$ and beam $S_2$ into the enclosure, in cavity operation, comprise a Glan prism at each end of an arm corresponding to a propagation direction of beams $S_1$ and $S_2$ into the vapour and on each of the arms in the enclosure, each of the beams $S_1$ and $S_2$ being introduced with the same polarization into one of the Glan prisms and in directions which, following their passage into said prisms, make it possible to have the same propagation direction, corresponding to an arm, but of the opposite sense.

6. A system according to claim 1, wherein, in cavity operation, it comprises means for reflecting the beams $S_1$ and $S_2$ on to themselves, said means comprising plane mirrors associated with Pockels cells, the assemblies constituted by the plane mirrors and Pockels cells being positioned symmetrically at each end of the arms and means for inverting beam $S_2$ towards other arms, said means comprising a Pockels cell located on each arm.

7. A system according to claim 1, wherein the means for superimposing the beams $S_1', S''_1, \ldots, S_1^{(n)}$ so as to form beams $S_1$ incorporate a group of semitransparent plates having a reflection coefficient 0.5, which successively splits the different beams $S'_1, S''_1, \ldots S_1^{(n)}$ into two, whilst superimposing the split beams in order to obtain the different beams $S_1$ used in the system.

* * * * *